(12) United States Patent
Hart et al.

(10) Patent No.: US 10,785,059 B2
(45) Date of Patent: *Sep. 22, 2020

(54) PROCESSING OF WIRELESS SIGNALS FOR ACCESS POINTS USING A CENTRAL CONTROLLER

(71) Applicant: Cisco Technology, Inc., San Jose, CA (US)

(72) Inventors: Brian D. Hart, Sunnyvale, CA (US); David S. Kloper, Santa Clara, CA (US); Jiunming Huang, San Jose, CA (US); Glendon L. Akins, III, Fort Collins, CO (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/372,201

(22) Filed: Apr. 1, 2019

(65) Prior Publication Data

US 2019/0229951 A1 Jul. 25, 2019

Related U.S. Application Data

(62) Division of application No. 15/447,980, filed on Mar. 2, 2017, now Pat. No. 10,250,415.

(51) Int. Cl.
*H04L 25/00* (2006.01)
*H04L 27/26* (2006.01)
(Continued)

(52) U.S. Cl.
CPC .............. *H04L 25/00* (2013.01); *H04L 27/26* (2013.01); *H04W 88/085* (2013.01);
(Continued)

(58) Field of Classification Search
CPC ........................ H04L 25/03019; H04B 1/1036
See application file for complete search history.

(56) References Cited

U.S. PATENT DOCUMENTS 7,073,066 B1 7/2006 Nessett
2015/0124785 A1 5/2015 Merlin et al.
(Continued)

OTHER PUBLICATIONS

3rd Generation Partnership Project; Technical Specification Group Radio Access Network; Evolved Universal Werrestrial Radio Access (E-UTRA); Physical layer procedures (Release 14), 3GPP TS 36.213 V14.0.0 (Sep. 2016), pp. 645-395.

*Primary Examiner* — Melanie Jagannathan
(74) *Attorney, Agent, or Firm* — Patterson + Sheridan, LLP

(57) ABSTRACT

Techniques are disclosed to reduce latency of processing for access points using a central controller. For example, an example method of wireless communication includes receiving, at an access point, a signal wirelessly. The method further includes filtering the signal using a first passband filter having a first bandwidth to generate a first filtered signal. The method further includes filtering the signal using a second passband filter having a second bandwidth to generate a second filtered signal, wherein the first bandwidth is less than the second bandwidth. The method further includes determining whether the signal includes a packet based on the first filtered signal and generating a control signal indicative of the determination. The method further includes transmitting the control signal and the second filtered signal to a central controller.

18 Claims, 7 Drawing Sheets

(51) Int. Cl.
*H04W 88/08* (2009.01)
*H04L 5/00* (2006.01)
*H04W 88/12* (2009.01)
*H04W 74/08* (2009.01)

(52) U.S. Cl.
CPC ........ *H04L 5/0048* (2013.01); *H04L 27/2647* (2013.01); *H04W 74/0808* (2013.01); *H04W 88/12* (2013.01)

(56) References Cited

U.S. PATENT DOCUMENTS

2016/0029404 A1    1/2016   Aryafar et al.
2018/0255547 A1    9/2018   Hart et al.

PROCESSING OF WIRELESS SIGNALS FOR ACCESS POINTS USING A CENTRAL CONTROLLER

CROSS-REFERENCE TO RELATED APPLICATIONS

This application is a divisional of co-pending U.S. patent application Ser. No. 15/447,980, filed Mar. 2, 2017. The aforementioned related patent application is herein incorporated by reference in its entirety.

TECHNICAL FIELD

Embodiments of the invention generally relate to techniques for processing of wireless signals for access points using a central controller. More specifically, embodiments presented herein are directed to processing techniques for reducing latency of processing for access points using a central controller.

BACKGROUND

Wireless networks such as wireless local area networks (WLANs) are often used for wireless communications. In a WLAN, a wireless station (STA) may communicate within the WLAN via one or more access points (APs) (also referred to as radio heads or endpoints). In particular, the STA may exchange wireless signals with an AP. The STA and AP may communicate according to a wireless communications standard, such as one or more of the IEEE 802.11 communication standards. Accordingly, the description herein will assume a wireless network that conforms to the IEEE 802.11 standard, and will use the terminology of the IEEE 802.11 standard. The embodiments described herein, however, are not restricted to such a network.

Normally, an AP may be configured to process received signals and signals for transmission locally at the AP. For example, when an AP receives wireless signals (e.g., noise, data, etc.), the AP normally digitizes the signals (e.g., inphase (I) and quadrature phase (Q) components of a signal) and locally processes the digitized signals at the AP to retrieve data from the signals, including performing packet detection to determine if the signals correspond to packets of data, pilot correction, equalization, demodulation, etc. Further, when an AP has data to transmit, the AP locally processes the data for wireless transmission, including performing packetization, filtering, etc. Such local processing by the AP may necessitate the AP have sufficient complexity to perform the processing. Accordingly, the AP may include complex hardware and/or software capable of locally performing the necessary processes, which may raise costs of the AP.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
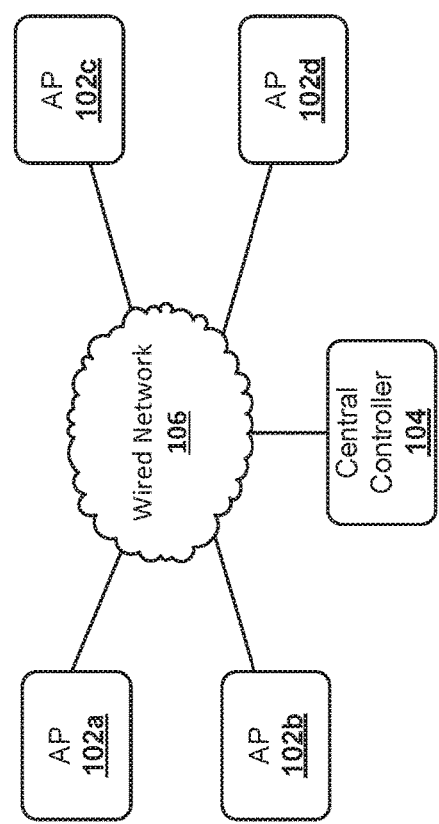
FIG. 1 is a block diagram illustrating an example of a wireless network, according to one embodiment.

One embodiment presented herein provides a method of wireless communication includes receiving, at an access point, a signal wirelessly. The method further includes filtering the signal using a first passband filter having a first bandwidth to generate a first filtered signal. The method further includes filtering the signal using a second passband filter having a second bandwidth to generate a second filtered signal, wherein the first bandwidth is less than the second bandwidth. The method further includes determining whether the signal includes a packet based on the first filtered signal and generating a control signal indicative of the determination. The method further includes transmitting the control signal and the second filtered signal to a central controller.

Another embodiment presented herein provides an access point. The access point includes a receiver configured to receive a signal wirelessly. The access point further includes a processor configured to filter the signal using a first passband filter having a first bandwidth to generate a first filtered signal. The processor is further configured to filter the signal using a second passband filter having a second bandwidth to generate a second filtered signal, wherein the first bandwidth is less than the second bandwidth. The processor is further configured to determine whether the signal includes a packet based on the first filtered signal and generating a control signal indicative of the determination. The access point further includes a transmitter configured to transmit the control signal and the second filtered signal to a central controller.

Another embodiment presented herein provides an access point including means for receiving, at an access point, a signal wirelessly. The access point further includes means for filtering the signal using a first passband filter having a first bandwidth to generate a first filtered signal. The access point further includes means for filtering the signal using a second passband filter having a second bandwidth to generate a second filtered signal, wherein the first bandwidth is less than the second bandwidth. The access point further includes means for determining whether the signal includes a packet based on the first filtered signal and generating a control signal indicative of the determination. The access point further includes means for transmitting the control signal and the second filtered signal to a central controller.

Another embodiment presented herein provides a non-transitory computer-readable medium comprising instructions that when executed by a computing system perform a method. The method includes receiving, at an access point, a signal wirelessly. The method further includes filtering the signal using a first passband filter having a first bandwidth to generate a first filtered signal. The method further includes filtering the signal using a second passband filter having a second bandwidth to generate a second filtered signal, wherein the first bandwidth is less than the second bandwidth. The method further includes determining whether the signal includes a packet based on the first filtered signal and generating a control signal indicative of the determination. The method further includes transmitting the control signal and the second filtered signal to a central controller.

Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Embodiments presented herein provide techniques for processing of wireless signals for APs using a central controller. More specifically, embodiments presented herein are directed to processing techniques for reducing latency of processing for APs using a central controller. In some embodiments, multiple APs may be part of a distributed network architecture. The multiple APs may be controlled by a common or central controller. For example, the multiple APs may be coupled by a wired medium (e.g., fiber, coax, copper, etc.) to the central controller. In particular, in certain embodiment an AP receives wireless signals, converts the received signals to digitized signals (e.g., digitized IQ signals) and sends information indicative of the digitized signals to a central controller (via a wired connection) for processing. Similarly, in certain embodiments, the central controller is configured to process signals for transmission by the APs and send information indicative of the signals to the APs for transmission. Accordingly, in certain embodiments, processing can be offloaded from the APs to the central controller instead, reducing the complexity needed for the APs. In particular, the central controller performs certain processing of signals for the APs.

The overall processing including reception/transmission by the AP, and processing by the central controller, may be subject to tight latency requirements. For example, the 802.11 communications standard may have certain latency requirements with respect to wireless signal exchange. Accordingly, certain embodiments provide different processing techniques (which can be implemented at the APs, central controller, or some combination of the two) to help meet the latency requirements.

Certain embodiments described herein relate to techniques for performing preliminary packet (e.g., PHY layer convergence procedure (PLCP) protocol data unit (PPDU)) detection with a reduced bandwidth passband filter along with regular packet detection using a full bandwidth passband filter. In certain embodiments, preliminary packet detection is performed at the AP and a signal indicative of the results of the preliminary packet detection is transmitted by the AP to the central controller over a wired connection. In certain embodiments, the preliminary packet detection is performed at the central controller. Further, in certain embodiments, the central controller is configured to utilize the results of the preliminary packet detection for scheduling transmission of signals by the AP (e.g., for clear channel assessment (CCA)).

Certain embodiments described herein relate to performing processing of the portion of signals corresponding to pilot tones (e.g., pilot signals in the frequency domain used for processing of data signals) in parallel with the processing of the signals overall, where the signals include both pilot tones and data tones (e.g., data signals in the frequency domain). In particular, certain embodiments relate to performing a partial discrete Fourier transform (DFT) on the portion of a signal corresponding to pilot tones in parallel with performing a fast Fourier transform (FFT) of the entire signal. In certain embodiments, the DFT and FFT are performed at the central controller. In certain embodiments, the DFT and FFT are performed at the AP.

Certain embodiments described herein relate to precomputing steering matrices for transmitting a signal (e.g., one or more packets) from multiple APs to one or more receivers (e.g., STA) utilizing beamforming techniques. In particular, in certain embodiments the central controller precomputes, for a plurality of sets of APs, a steering matrix for each of a plurality of APs of the set of APs that may be used to transmit to a STA. In certain embodiments, the central controller, for each of the sets of APs, further applies each of the steering matrices to a copy of the transmission (e.g., to a preamble or portion of a preamble of the packet, such as a legacy short training field (LSTF)) for each of the APs. Accordingly, when the actual set of APs for transmitting the signal is determined, the transmission with the appropriate steering matrix already applied can be transmitted by each of the APs of the set without having to wait for the steering matrices to be computed and applied to the transmission.

Certain embodiments described herein provide processing of signals received by the AP from the central controller includes utilizing a filter (e.g., finite impulse response (FIR) filter) to process the signals. Certain embodiments herein relate to the central controller inserting samples at multiple points in the delay line of the filter (or recycling samples in the delay line) to more quickly fill the delay line, thereby reducing the latency for utilizing the filter. Accordingly, the AP can more quickly wireless transmit the signals received from the central controller.

In some embodiments, communication between the central controller and APs is handled as follows. In certain embodiments, the central controller generates a signal (e.g., baseband signal that is a continuous waveform) for wireless transmission by one or more APs. The central controller samples the signal into a discrete signal and packetizes the samples corresponding to the discrete signal into a plurality of packets (e.g., any suitable packet structure, such as, an Ethernet frame). For example, one or more samples of the discrete signal may be segmented into each packet. The central controller may further prepend a preamble (e.g., header including information such as a destination address, source address, etc. for the packet)) to the packet for transport over the wired medium, or omit some or all of these fields to maximize the bandwidth available for sample transportation. The central controller then sends the plurality of packets to each of the APs over the wired medium. Accordingly, in some embodiments, the transmissions over the wired medium may be packet (e.g., frame) based transmissions.

Each of the APs receives the plurality of packets including the samples corresponding to the discrete signal. The APs then reconstruct the original signal based on the received samples using signal processing techniques such as a reconstruction filter and wirelessly transmits the signal. In some embodiments, other data is generated by the central controller and sent to the AP, and the AP constructs a baseband signal for wireless transmission.

Similarly, in some embodiments, the AP receives wireless signals, converts the received signals to digitized signals (e.g., digitized IQ signals), generates packets corresponding to the digitized signals, and sends the packets to the central controller via the wired medium for processing. The central controller receives the packets, reconstructs the digitized signal, and processes the digitized signal as described herein. In some embodiments, other data is generated by the AP and sent to the central controller for processing.

FIG. 1 is a block diagram illustrating an example of a wireless network 100. For purposes of the example being described herein, four access points (APs) 102a-102d are illustrated although those skilled in the art should readily appreciate that the principles described herein are applicable to any network with any physically realizable number of wireless endpoints such as access points. APs 102a-102d are coupled by a wired medium, shown as wired network 106, to a central controller 104. The wired network 106 may be any suitable wired networking topology using a suitable wired medium (e.g., fiber, coax, copper, etc.) to couple devices (e.g., APs 102a-102d and central controller 104) and allow data exchange between the devices.

In some embodiments, the wired network 106 supports packet based (e.g., frame based) communications such as Ethernet based communications. In some embodiments, the packets communicated over the wired network 106 between the APs 102a-102d and the central controller 104 conform to a standard, such as, IEEE 802.3. The packets may include a preamble or header (e.g., including a destination address and source address for routing the packet, such as, media access control (MAC) addresses of a source device and a destination device for the packets). The packets may further include a payload.

In some embodiments, each of the APs 102a-102d support wireless communication in the wireless network 100. For example, the APs 102a-102d may communicate with each other or other wireless devices, such as, computers, cell phones, internet of things (IoT) devices, tablets, STAs, etc. over a wireless medium in the wireless network 100. The APs 102a-102d and other devices communicating over the wireless medium in the wireless network 100 may utilize any suitable wireless network topology and any suitable wireless communication mechanism. For example, in some embodiments, the APs 102a-102d communicate according to at least one of the IEEE 802.11 communication standards.

As discussed herein, in some embodiments, the central controller 104 is configured to perform signal processing for the APs 102a-102d in the wireless network 100.

Figure 2:
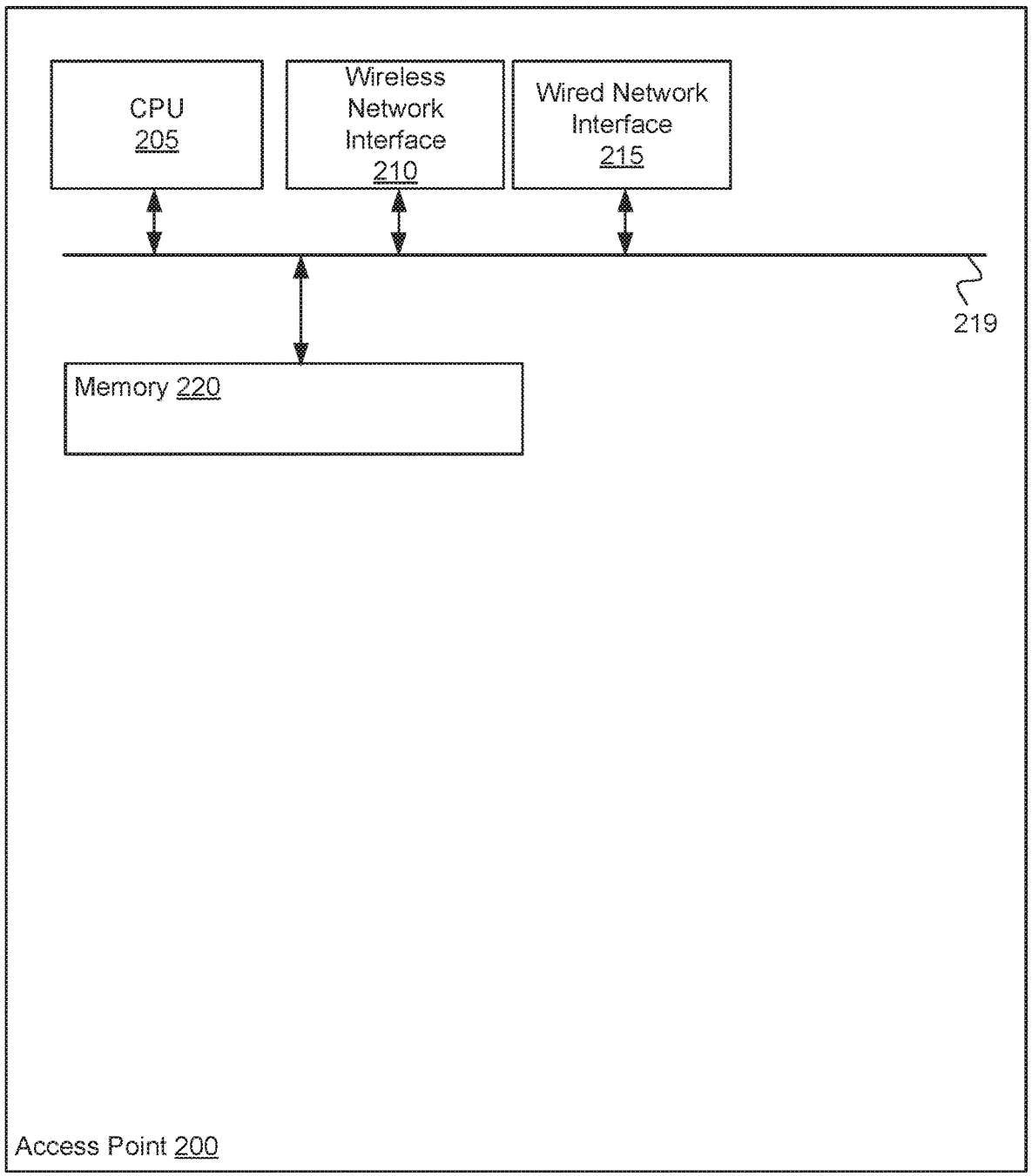
FIG. 2 illustrates an example access point, according to one embodiment.

FIG. 2 illustrates an example access point 200 (e.g., an example of an endpoint, AP 102, etc.), according to one embodiment. For example, the access point 200 may be configured to perform one or more of the techniques discussed herein. As shown, the access point 200 includes, without limitation, a central processing unit (CPU) 205, a wireless network interface 210, a wired network interface 215, and a memory 220, each connected to a bus 219.

The CPU 205 retrieves and executes programming instructions stored in the memory 220, for example, instructions to perform or direct operations discussed herein. The bus 219 is used to transmit programming instructions, data, and signals between the CPU 205, wireless network interface 210, wired network interface 215, and memory 220. Note, CPU 205 is included to be representative of a single CPU, multiple CPUs, a single CPU having multiple processing cores, and the like. And the memory 220 is generally included to be representative of a random access memory and/or non-volatile memory.

In certain embodiments, the wireless network interface 210 comprises one or more antennas, a receiver, and a transmitter for communicating wireless signals. The wireless network interface 210, in certain embodiments, further includes a modem (e.g., baseband modem) configured to encode digital information on one or more carrier waves for transmission over a wireless medium. In certain embodiments, the modem is further configured to decode and retrieve digital information received on one or more carrier waves over a wireless medium.

The wireless network interface 210 may communicate with the CPU 205 via the bus 219. The CPU 205 may process the digital information received from the wireless network interface 210 or sent to the wireless network interface 210. For example, in certain embodiments, the CPU 205 performs preliminary packet detection on digital signals, performs a DFT and/or FFT on digital signals, applies a steering matrix to a preamble, schedules transmissions, performs channel equalization, and/or performs other packet or signal processing. In some embodiments, the CPU 205 may comprise a digital signal processor (DSP).

In certain embodiments, the wired network interface 215 comprises a network interface card (NIC). In certain embodiments, the wired network interface 215 packetizes data, as discussed herein. The wired network interface 215 is configured to communicate over a wired medium with other devices, such as a central controller. Accordingly, the wired network interface 215 sends and receives data over the wired medium. The wired network interface 215 may communicate with the CPU 205 via the bus 219. The CPU 205 may process the digital information received from the wired network interface 215 or sent to the wired network interface 215.

Figure 3:
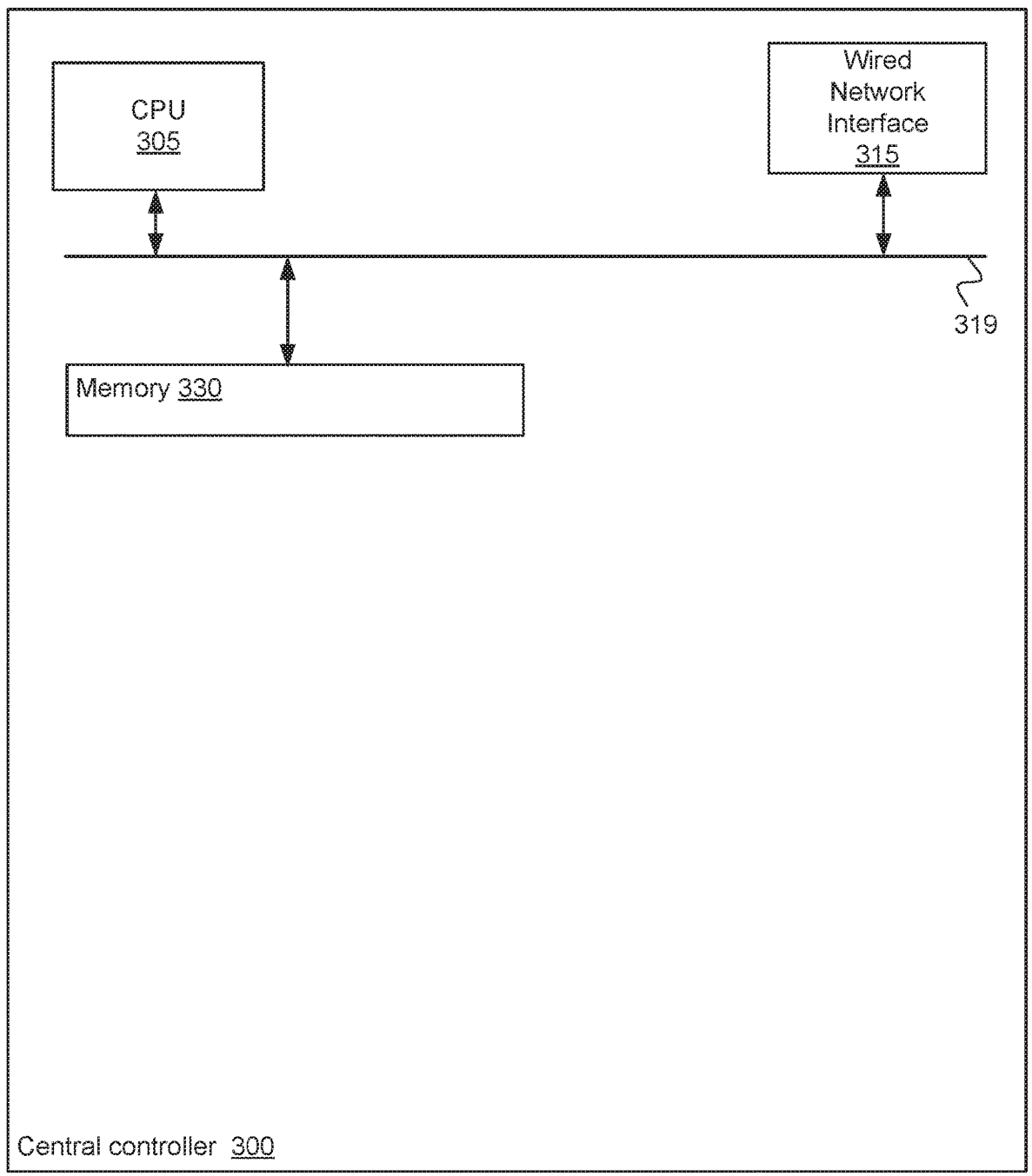
FIG. 3 illustrates an example central controller, according to one embodiment.

FIG. 3 illustrates an example central controller 300 (e.g., central controller 104), according to one embodiment. For example, the central controller 300 may be configured to perform one or more of the techniques discussed herein. As shown, the central controller 300 includes, without limitation, a central processing unit (CPU) 305, a wired network interface 315, and a memory 330, each connected to a bus 319.

The CPU 305 retrieves and executes programming instructions stored in the memory 330, for example, instructions to perform or direct operations discussed herein. The bus 319 is used to transmit programming instructions, data, and signals between the CPU 305, wired network interface 315, and memory 330. Note, CPU 305 is included to be representative of a single CPU, multiple CPUs, a single CPU having multiple processing cores, and the like. And the memory 330 is generally included to be representative of a random access memory and/or non-volatile memory.

In certain embodiments, the wired network interface 315 comprises a network interface card (NIC). In certain embodiments, the wired network interface 315 packetizes data, as discussed herein. The wired network interface 315 is configured to communicate over a wired medium with other devices, such as one or more access points. Accordingly, the wired network interface 315 sends and receives data over the wired medium. The wired network interface 315 may communicate with the CPU 305 via the bus 319.

The CPU 305 may process the digital information received from the wired network interface 315 or sent to the wired network interface 315. For example, the CPU 305 may perform preliminary packet detection on digital signals, perform a partial DFT and/or FFT on digital signals, apply a steering matrix to a preamble, schedule transmissions, perform channel equalization, and/or perform other packet or signal processing. In some embodiments, the CPU 305 may comprise a digital signal processor (DSP).

An AP (e.g., AP 102) may receive packets over a wireless medium in an asynchronous manner, meaning that the AP 102 does not always know at what specific time it will receive a packet. Accordingly, the AP 102 may normally check the wireless medium for a packet by performing packet detection. In certain embodiments, the AP 102 receives a signal corresponding to an allocated bandwidth (e.g., particular frequency range, carrier frequency, etc.) used by the AP 102 for communication on the wireless medium. In particular, in certain embodiments, the AP 102 applies a passband filter with a bandwidth corresponding to the entire allocated bandwidth to any received signals on the wireless medium to ensure that all signals in the allocated bandwidth are passed through the passband filter and processed by the AP 102. The AP 102 may then perform packet detection on the signal passed through the passband filter.

In certain embodiments, the AP 102 performs packet detection by determining if certain information is in the signal indicating that there is at least one packet in the signal. For example, the AP 102 may determine whether there is a particular series of repeating data (e.g., legacy long training field (LLTF), legacy short training field (LSTF), etc.) in the received signal, which may be part of a preamble of a packet.

In certain communications standards, the series of repeating data may not take up the entire allocated bandwidth. In particular, the series of repeating data may not occupy the edge (e.g., lower 2.5 MHz and upper 2.5 MHz) of the allocated bandwidth. Further, different passband filters may have different associated delays (e.g., time delays for performing the filtering). In certain embodiments, a passband filter with a larger passband and/or better response (e.g., flatter passband, deeper stopband attenuation, linear phase) for the relevant frequencies may take longer to filter signals. Further, a passband filter with a smaller passband and a wider transition band, non-linear phase and/or sloppier in-band ripple for the relevant frequencies may take a shorter period of time to filter signals.

Accordingly, in certain embodiments, the AP 102 is configured to perform a preliminary packet detection, such as by using a reduced bandwidth passband filter, in parallel with performing a regular packet detection, such as by using a full bandwidth passband filter, as further discussed herein. It should be noted that though preliminary packet detection and regular packet detection are discussed with respect to the AP 102, such procedures may instead be performed by the central controller 104, as discussed. In certain embodiments, where the signal comprises a plurality of training fields, the reduced bandwidth passband filter is designed such that at least a portion of one of the plurality of training fields occupies the reduced bandwidth passed by the reduced bandwidth passband filter. For example, packet detection may be able to be performed using the portion (e.g., bandwidth) of the signal corresponding to one of the plurality of training fields. Further, packet detection may be able to be performed by using the portion (e.g., bandwidth) of the signal corresponding to less than all (e.g., substantially all) of the one of the plurality of training fields. Further, in some embodiments, a training field may be duplicated in the frequency domain, and packet detection may be able to be performed by using only one portion (e.g., copy) of the training field. In certain embodiments, the full bandwidth of the signal may comprise additional data fields and/or training fields that occupy the full bandwidth.

and wherein the signal comprises at least one data field occupying the second bandwidth In certain embodiments, the AP 102 uses a passband filter with a reduced delay (e.g., having a sloppier frequency response, having a pass bandwidth corresponding to less than the allocated bandwidth, having a pass bandwidth corresponding to the series of repeating data, attenuating certain portions of the bandwidth allocated to data) to filter a signal, and performs preliminary packet detection on the filtered signal. The preliminary packet detection may not be as accurate as a regular packet detection, but may take less time, and may be utilized for certain procedures as discussed herein, such as CCA. Further, in certain embodiments, the AP 102 uses a passband filter with a full bandwidth corresponding to the allocated bandwidth to filter the signal, and performs regular packet detection on the filtered signal. The regular packet detection may be more accurate than preliminary packet detection, but may take more time, and may be utilized for certain procedures as discussed herein.

In certain embodiments, in addition to or alternatively to utilizing a reduced delay filter, the AP 102 may perform the preliminary packet detection utilizing a lower number of samples (e.g., measured over 400 ns) of the received signal as compared to a number of samples (e.g., measured over 800 ns) of the received signal used for regular packet detection. By utilizing a lower number of samples the latency for performing the preliminary packet detection as compared to the regular packet detection is reduced, though accuracy of the packet detection may be reduced as well. In certain embodiments, when utilizing a lower number of samples, the AP 102 utilizes one or more techniques for performing preliminary packet detection that are suitable to being carried out using a lower number of samples. For example, in certain embodiments, the AP 102 utilizes one or more of absolute power measurement, power rise measurement, cross correlation, or a hybrid of shortened absolute energy measurement, energy rise, and cross correlation.

In some embodiments, the AP 102 determines whether a packet is detected utilizing the preliminary packet detection, and sends a control signal to the central controller 104 indicating whether a packet is detected or not. In certain embodiments, the AP 102 sends the control signal with a digitized signal (e.g., samples) of the received signal on which packet detection was performed to the central controller 104. In certain embodiments, the digitized signal sent corresponds to the signal as filtered by the passband filter having the full allocated bandwidth.

In certain embodiments, the central controller 104, based on the preliminary packet detection, performs a clear channel assessment (CCA). In particular, if the central controller 104 itself, or based on receiving a control signal from the AP 102 indicating a packet is detected, determines there is a packet detected by the preliminary packet detection, the central controller 104 stops transmission (e.g., stops scheduling of transmission) in a time slot (e.g., transmission time slot) where the packet is detected and performs a normal CCA (e.g., back-off procedure where transmissions are stopped for a number of time slots (e.g., 16)).

However, as discussed, in certain embodiments the preliminary packet detection may not be entirely accurate. Accordingly, in certain embodiments, after the central controller 104 stops transmission by the AP 102 on the time slot based on the preliminary packet detection, the central controller 104 performs a better packet detection, such as a regular packet detection. If the central controller 104 determines that a packet is detected based on the regular packet detection as well, the normal CCA process continues. However, in certain embodiments, if the central controller 104 determines that a packet is not detected based on the regular packet detection, the central controller 104 resumes transmissions by the AP 102 earlier than per the normal CCA back-off procedure (e.g., in the next time slot, less than 5 time slots later, etc.).

In certain embodiments, if the central controller 104 itself, or based on receiving a control signal from the AP 102 indicating a packet is not detected, determines there is not a packet detected by the preliminary packet detection, the central controller 104 schedules transmission by the AP 102 in a time slot (e.g., transmission time slot). Alternatively, the central controller 104 may schedule transmission by the AP 102 in the time slot based on other procedures. In certain embodiments, after the central controller 104 schedules or starts transmission by the AP 102 on the time slot, the central controller 104 performs a regular packet detection. If the central controller 104 determines that no packet is detected based on the regular packet detection as well, the scheduled transmission process continues. However, in certain embodiments, if the central controller 104 determines that a packet is detected based on the regular packet detection, the central controller 104 stops transmissions by the AP 102 (e.g., belatedly aborts the transmission before anything is transmitted such as when preparing for the transmission takes time (e.g., 600-800 ns)). Accordingly, interference from the transmission is avoided.

Figure 4:
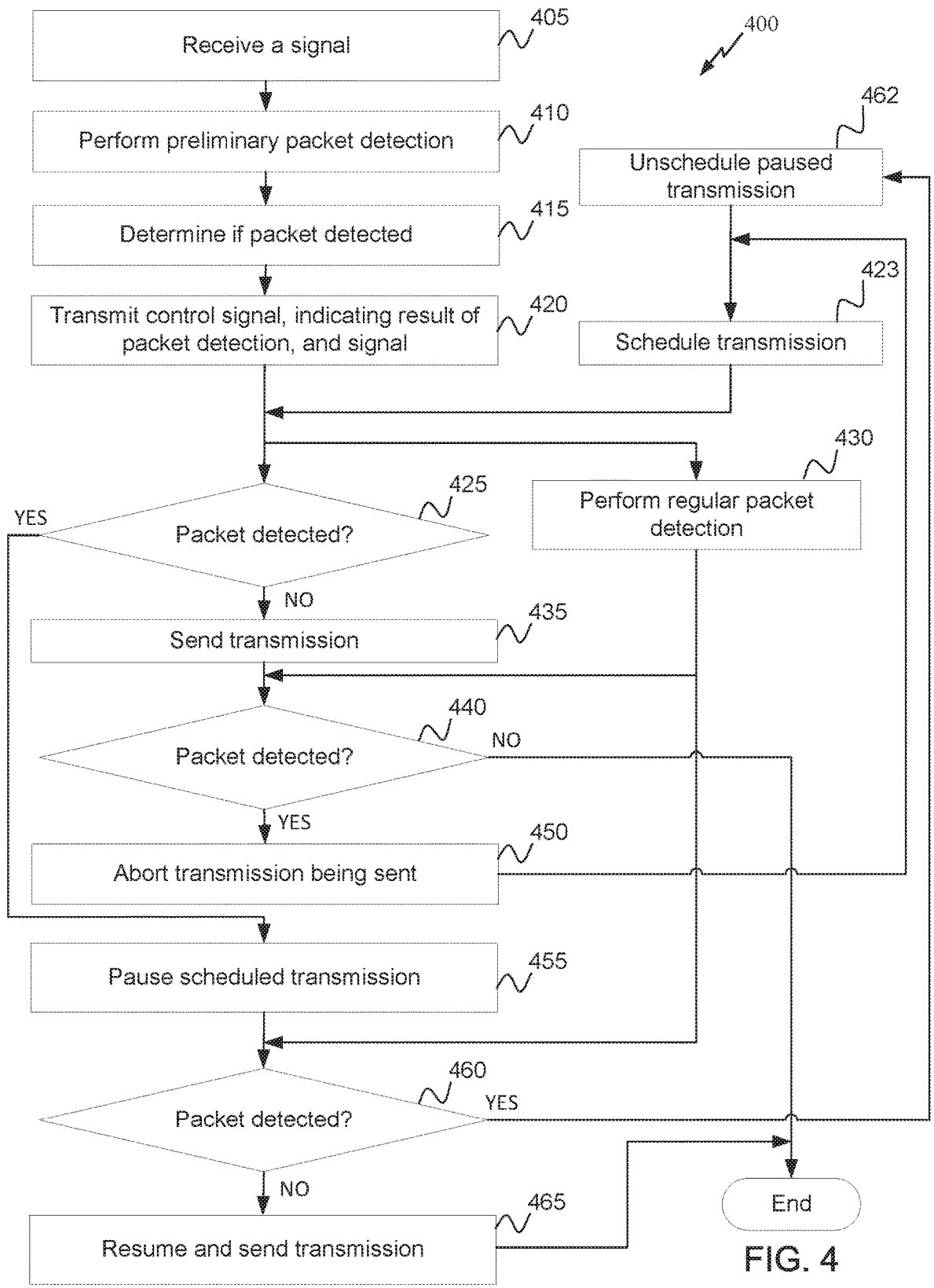
FIG. 4 illustrates a flowchart of a method for performing preliminary packet detection, according to an embodiment.

FIG. 4 illustrates a flowchart of a method 400 for performing preliminary packet detection, according to an embodiment.

At 405, the AP 102 receives a signal. At 410, the AP 102 performs a preliminary packet detection on the received signal. For example, the AP 102 utilizes a reduced bandwidth filter and/or reduced number of samples, as discussed herein, to perform the packet detection.

Continuing, at 415, the AP 102 determines whether or not the preliminary packet detection indicates a packet was detected. At 420, the AP 102 transmits a control signal indicative of whether a packet was detected or not to the central controller 104 along with samples of the received signal.

At 423, in parallel with any of steps 405-420, or before or after steps 405-420, the central controller starts to schedule a transmission for the AP 102. For example, the central controller 104 performs a carrier sense multiple access with collision avoidance (CSMA/CA) procedure to schedule the transmission when the channel is sensed as idle (e.g., after waiting for a period of time). At 425, the central controller 104 determines whether or not the control signal indicates if a packet is detected. In parallel to 425, at 430, the central controller 104 performs a regular packet detection on the samples of the received signal. If at 425, the central controller determines that a packet is not detected, the process continues to 435. If at 425, the central controller determines that a packet is detected, the process continues to 455.

At 435, the central controller 104 indicates to the AP 102 to send the transmission. For example, the central controller 104 sends a control signal to the AP 102 to send the scheduled transmission. The central controller may also send waveform information for the transmission. Continuing, at 440, the central controller 104 determines whether the regular packet detection (at 430) indicates whether a packet was detected. If at 440, the central controller determines that a packet is not detected the process ends. If at 440, the central controller determines that a packet is detected, at 450, central controller 104 aborts the transmission being sent and the AP 102 does not transmit data. For example, the central controller 104 sends a control signal to the AP 102 to abort the transmission being sent. The central controller may also zero the waveform information it is sending for the scheduled transmission. The process then returns to 423 where a transmission is again scheduled and packet detection is performed (e.g., steps 405-420).

At 455, the central controller pauses the scheduled transmission of 423 for a period of time (e.g., a fixed time, until an event occurs, etc.) by the AP 102. Continuing, at 460, the central controller 104 determines whether the regular packet detection (at 430) indicates whether a packet was detected. If at 460, the central controller determines that a packet is detected the process proceeds to 462. At 462, the paused transmission is unscheduled by the AP 102. The process then returns to 423 where a transmission is again scheduled and packet detection is performed (e.g., steps 405-420). If at 460, the central controller determines that a packet is not detected, at 465, central controller 104 resumes the scheduled transmission for the AP 102 before the period of time expires and indicates to the AP 102 to send the transmission. For example, the central controller 104 sends a control signal to the AP 102 to send the scheduled transmission. The central controller may also send waveform information for the transmission.

When receiving signals, an AP 102 may process the received signals as discussed. As part of processing the received signals, the AP 102 may perform a FFT on the received signals, followed by pilot correction of the received signals, followed by equalization of the received signals, followed by an optional channel smoothing of the received signals, and followed by demodulation of the received signals. As discussed, the received signal corresponds to pilot tones and data tones.

When performing a FFT on the received signal, the tones (e.g., signal carriers, such as data tones and pilot tones) are output from the FFT out of order, and therefore one or more pilot tones may be output later than the first data tone is output. However, in order to perform pilot correction (e.g., correction of changes in the carrier phase) for the data tones, the AP 102 needs all of the pilot tones. Therefore, the data tones cannot be processed until the pilot tones are output from the FFT.

Accordingly, in certain embodiments the AP 102 (or the central controller 104) is configured to perform a DFT on the portion of the received signal corresponding to just the pilot tones in parallel with performing the FFT on the entire received signal. Unlike the FFT, the DFT may be performed on specific tones in specific order. Further, since the DFT is run only on the pilot tones, the complexity of the DFT is reduced, thereby reducing the latency for performing the DFT. Accordingly, the DFT outputs the pilot tones with lower latency, and any data tones output by the FFT can be processed as discussed after the DFT completes, without having to wait for the pilot tones from the FFT.

Figure 5:
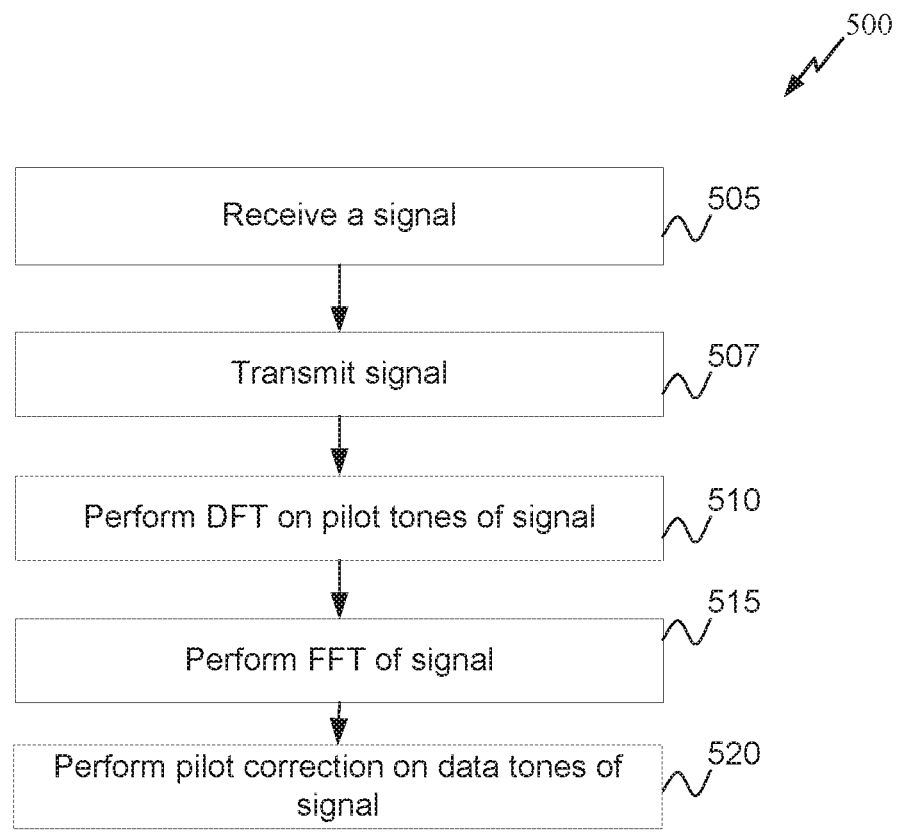
FIG. 5 illustrates a flowchart of a method for pilot correction, according to an embodiment.

FIG. 5 illustrates a flowchart of a method 500 for pilot correction, according to an embodiment.

At 505, the AP 102 receives a wireless signal. At 507, the AP 102 further digitizes the signal and transmits the digitized signal to the central controller 104. At 510, the central controller 104 performs a DFT on the pilots tones corresponding to the digitized signal. Further, in parallel to 510, at 515, the central controller 104 performs a FFT on the digitized signal. At 520, the central controller 104 utilizes the pilot tones from the DFT to perform pilot correction on data tones from the FFT.

In certain embodiments, the central controller 104 may be configured to coordinate transmission from multiple APs 102 to a one or more receivers (e.g., STA). For example, the multiple APs 102 may transmit a signal (e.g., one or more packets) utilizing beamforming techniques to transmit the signal to one or more STAs as controlled by the central controller 104. In order to perform beamforming, a particular steering matrix may need to be applied to a transmission (e.g., a packet (e.g., to a preamble of the packet, such as a legacy short training field (LSTF))) for each AP 102 used to transmit the signal. For example, each AP 102 may transmit a preamble with a different steering matrix applied in order to achieve beamforming from the multiple APs 102. Calculating each steering matrix for each AP 102 may take time. Accordingly, calculating steering matrices for the APs 102 when the central controller 104 determines which APs 102 to use for transmitting a preamble may add latency to transmission of the packet.

Accordingly, in certain embodiments, the central controller 104 precomputes steering matrices for one or more sets of APs 102 that may be used (e.g., as determined by the central controller 104 based on scheduling techniques, including AP availability, AP proximity to the receiver, etc., before the packet is transmitted) to transmit a preamble before a packet is ready for transmission using the preamble. For example, the central controller may determine different groupings or sets of APs 102 that may be used for beamforming, and determine and transmit steering matrices for each of the APs for each set. For example, one grouping or set of APs may be AP 102a, AP 102b, AP 102c, another set may be AP 102a, AP 102b, another set may be AP 102c, AP 102d, etc. Accordingly, the central controller 104 may determine a set of steering matrices for each of APs 102a, 102b, and 102c that correspond to one set of APs, another set of steering matrices for APs 102a, 102b, that correspond to another set of APs, etc. Therefore, multiple steering matrices may be calculated for a single AP, one for each set the AP belongs to. In some embodiments, the central controller may determine steering matrices for each of the APs 102 for only certain sets of APs, and then later derive steering matrices for other sets of APs 102 (e.g., with one or more added or subtracted APs 102 from the set). The central controller 104 may store the steering matrices for each AP 102, and/or may transmit appropriate steering matrices to each AP 102 for storage at the AP 102. The precomputed steering matrices can then be applied by the central controller 104 or AP 102 at the time of transmission to the actual set (e.g., as determined by the central controller 104, including AP availability, AP proximity to the receiver, etc., when the packet is transmitted) of APs 102 used for beamforming, thereby reducing latency.

Further, in certain embodiments, the central controller 104 precomputes a preamble (e.g., LTSF) for a packet before the packet is ready for transmission. In certain embodiments, the central controller 104 further applies the appropriate steering matrices to copies of the LTSF for the packet, and stores the LTSF for each AP 102 for each grouping of APs 102, and/or transmits the appropriate LTSFs to each AP 102 for storage at the AP 102. The LTSF can then be used by the central controller 104 or AP 102 at the time of transmission for building the packet, thereby reducing latency. In certain embodiments (e.g., when the AP 102 communicates according to the 802.11ag, 802.11n, 802.11ac, or 802.11ax standards), the LTSF comprises repeating subfields (e.g., of length 800 ns). Accordingly, in certain aspects, the central controller 104 or AP 102 can build the packet by repeating the steered LTSF. In certain embodiments (e.g., when the AP 102 utilizes direct sequence spread spectrum (DSSS)), the central controller 104 selects a seed for the random modulation of the LTSF so that that LTSF is similarly periodic (for two or more copies) and can be repeated. Storing just one copy of each LTSF further reduces the memory needed for storing the preamble.

Figure 6:
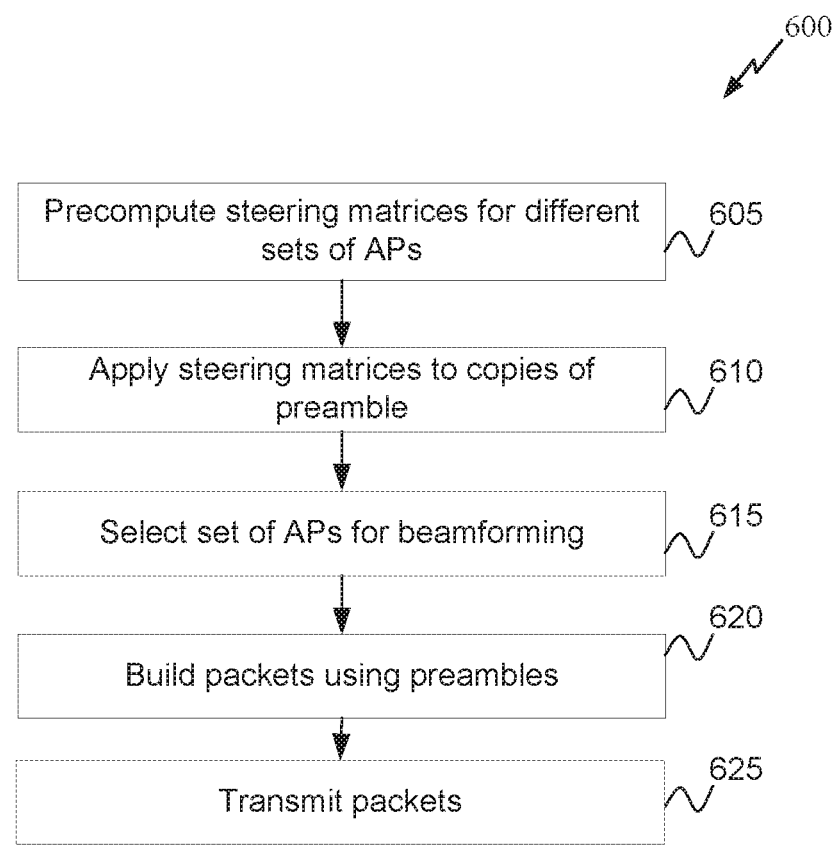
FIG. 6 illustrates a flowchart of a method for performing beamforming, according to an embodiment.

FIG. 6 illustrates a flowchart of a method 600 for performing beamforming, according to an embodiment.

At 605, the central controller 104 precomputes steering matrices for different sets of APs (each set including a different plurality of APs, where an AP may belong to more than one set) that may be used to transmit a packet utilizing beamforming to a receiver. At 610, the central controller 104 applies each precomputed steering matrix to a separate copy of a preamble for each AP of each set of APs. At 615, the central controller 104 determines the set of APs to transmit the packet utilizing beamforming. At 620, central controller 104 builds the packet for each AP 102 utilizing the corresponding copy of the preamble. At 625, the determined set of APs transmit the steered packets respectively to the receiver.

In certain embodiments, when the central controller 104 transmits signals (e.g., samples) to the AP 102 over the wired medium (e.g., over a fronthaul) for transmission, the signals are transmitted at minimum excess bandwidth (e.g., with small guard bands), which makes image reject filtering at the AP 102 more difficult. In particular, for the AP 102 to receive and process the signal with a small guard band, in certain embodiments, it needs a long image reject filter (e.g., FIR filter) in the time domain.

In certain embodiments, switching from receiving signals from the central controller 104 to transmitting signals wirelessly may take the AP 102 a certain amount of time (e.g., 800-1000 ns). Accordingly, if the AP 102 is able to filter the signal received from the central controller in the time for switching from receive mode to transmit mode, no additional latency is added for performing the filtering. However, in certain embodiments, due to the small guard bands in the received signal, utilizing a filter with a length corresponding to the switching time is not feasible.

Accordingly, certain embodiments herein provide using a filter for signals received from the central controller 104, and inserting received samples at two or more points in the filter to fill the filter faster and process the received signal faster for transmission wirelessly. In certain embodiments, the filter is a FIR filter.

In certain embodiments, an image reject filter is a delay line (e.g., a long shift register with samples that enter on the left and shift along). The image reject filter further has a center tap. Initially, the delay line of the image reject filter is empty. As samples enter the image reject filter, the delay line fills up. Eventually, the samples reach the center tap of the image reject filter. Once the samples reach the center tap, the signal output from the image reject filter is able to be transmitted with adequate strength for transmission.

As discussed above, for certain communication standards, the preamble of the signal transmitted is a repetition of the same samples (e.g., LSTF). Accordingly, in certain embodiments, instead of just inserting samples at the beginning of the image reject filter and letting the delay line fill accordingly, the AP 102 inserts the samples at two or more points in the delay line. Accordingly, the delay line fills more quickly and transmission of the signal can begin more quickly. In certain embodiments, once the transmission is complete, the AP 102 resets the image reject filter.

In certain embodiments, the samples may be pre-staged and stored at the AP 102 before transmission of the signals from the central controller 104 to the AP 102, to further reduce latency.

In certain embodiments, the central controller 104 transmits frequency domain data to the AP 102 instead of time domain samples (e.g., frequency domain data corresponding to the time domain samples, such as calculated using an FFT) and the AP 102 applies an inverse FFT (IFFT) and cyclic extension at the AP 102 instead of utilizing an image reject filter. Accordingly, the use of the filter may be replaced by an IFFT and windowing techniques at the AP 102.

In certain embodiments, where the central controller 104 transmits DSSS or 802.11b signals to the AP 102 for transmission, the central controller may send the signals as chips tunneled through the sample interface. For example, where the central controller 104 normally sends 20 samples every 1 µs, the central controller 104 may transmit 11 chips and 9 padded zeros instead. Accordingly, the 11 chips are received at the AP 102 more quickly (e.g., 550 ns). The AP 102 may then utilize the chips to fill the image reject filter delay line as discussed herein.

Figure 7:
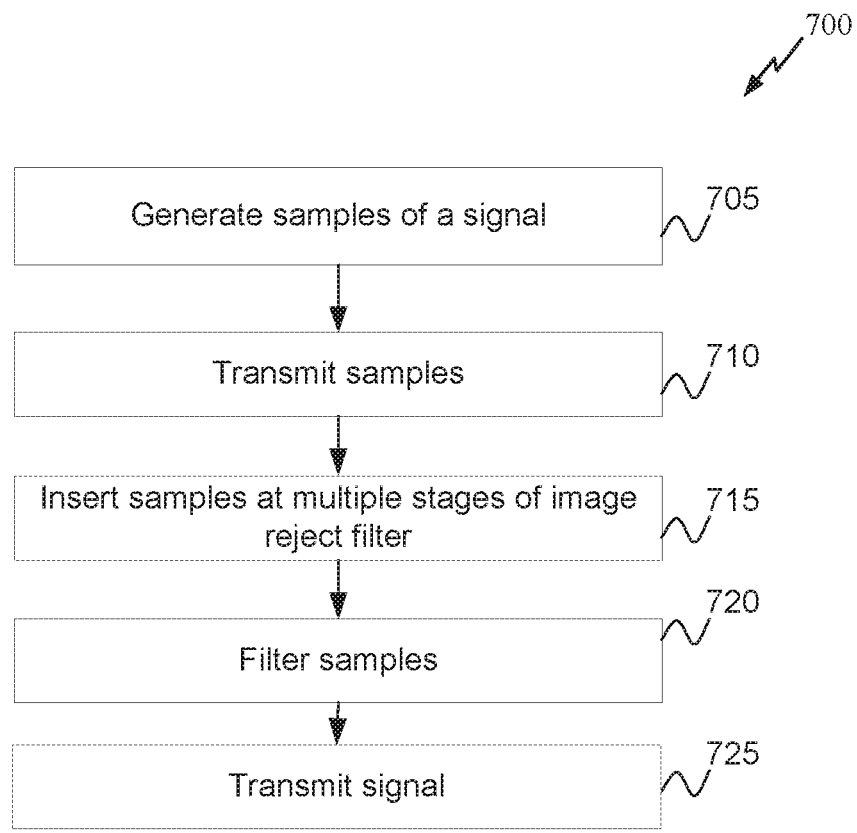
FIG. 7 illustrates a flowchart of a method for performing image reject filtering, according to an embodiment.

FIG. 7 illustrates a flowchart of a method 700 for performing image reject filtering, according to an embodiment.

At 705, the central controller 104 generates samples of a signal for wireless transmission by the AP 102. At 710, the central controller 104 transmits the samples to the AP 102. At 715, the AP 102 takes the samples received from the central controller 104 corresponding to a repeating set of data and inserts the samples at multiple stages of an image reject filter. At 720, the image reject filter filters the samples. At 725, the AP 102 transmits the signal.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of wireless communication comprising:
receiving, at an access point, a signal wirelessly;
filtering the signal using a first passband filter having a first bandwidth to generate a first filtered signal;
filtering the signal using a second passband filter having a second bandwidth to generate a second filtered signal, wherein the first bandwidth is less than the second bandwidth; and
determining whether the signal includes a packet based on the first filtered signal and generating a control signal indicative of the determination.

2. The method of claim 1, further comprising:
receiving a plurality of samples from an external computing entity;
inserting one or more samples of the plurality of samples corresponding to a periodically repeated portion of a preamble into a plurality of stages of an image reject filter;
filtering the plurality of samples using the image reject filter; and
transmitting the samples filtered using the image reject filter.

3. The method of claim 2, wherein the plurality of samples comprises a plurality of chips and padded zeros.

4. The method of claim 1, further comprising:
receiving a first training field with a steering matrix applied to the first training field from an external computing entity;
repeating the first training field to generate a preamble; and
transmitting the preamble wirelessly.

5. The method of claim 4, further comprising receiving a second training field with a second steering matrix applied from the external computing entity; and
receiving an indication from the external computing entity to utilize the first training field for the preamble.

6. An access point comprising:
a receiver configured to receive a signal wirelessly;
a processor configured to:
filter the signal using a first passband filter having a first bandwidth to generate a first filtered signal;
filter the signal using a second passband filter having a second bandwidth to generate a second filtered signal, wherein the first bandwidth is less than the second bandwidth; and
determine whether the signal includes a packet based on the first filtered signal and generating a control signal indicative of the determination.

7. The access point of claim 6, wherein:
the receiver is further configured to receive a plurality of samples from an external computing entity;
the processor is further configured to:
insert one or more samples of the plurality of samples corresponding to a periodically repeated portion of a preamble into a plurality of stages of an image reject filter; and
filter the plurality of samples using the image reject filter; and
wherein the access point further comprises a
a transmitter configured to transmit the samples filtered using the image reject filter.

8. The access point of claim 7, wherein the plurality of samples comprises a plurality of chips and padded zeros.

9. The access point of claim 6, wherein:
the receiver is further configured to receive a first training field with a steering matrix applied to the first training field from an external computing entity;
the processor is further configured to repeat the first training field to generate a preamble; and
wherein the access point further comprises a transmitter configured to transmit the preamble wirelessly.

10. The access point of claim 9, the receiver is further configured to
receive a second training field with a second steering matrix applied from the external computing entity; and
receive an indication from the external computing entity to utilize the first training field for the preamble.

11. A non-transitory computer-readable medium comprising instructions that when executed by a computing system perform a method, the method comprising:
receiving, at an access point, a signal wirelessly;
filtering the signal using a first passband filter having a first bandwidth to generate a first filtered signal;
filtering the signal using a second passband filter having a second bandwidth to generate a second filtered signal, wherein the first bandwidth is less than the second bandwidth; and
determining whether the signal includes a packet based on the first filtered signal and generating a control signal indicative of the determination.

12. The non-transitory computer-readable medium of claim 11, wherein the method further comprises:
- receiving a plurality of samples from an external computing entity;
- inserting one or more samples of the plurality of samples corresponding to a periodically repeated portion of a preamble into a plurality of stages of an image reject filter;
- filtering the plurality of samples using the image reject filter; and
- transmitting the samples filtered using the image reject filter.

13. The non-transitory computer-readable medium of claim 12, wherein the plurality of samples comprises a plurality of chips and padded zeros.

14. The non-transitory computer-readable medium of claim 11, wherein the method further comprises:
- receiving a first training field with a steering matrix applied to the first training field from an external computing entity;
- repeating the first training field to generate a preamble; and
- transmitting the preamble wirelessly.

15. The non-transitory computer-readable medium of claim 14, wherein the method, further comprises:
- receiving a second training field with a second steering matrix applied from the external computing entity; and
- receiving an indication from the external computing entity to utilize the first training field for the preamble.

16. The method of claim 1, further comprising:
- transmitting the control signal and the second filtered signal to an external computing entity.

17. The access point of claim 6, further comprising:
- a transmitter configured to transmit the control signal and the second filtered signal to an external computing entity.

18. The non-transitory computer-readable medium of claim 11, wherein the method further comprises:
- transmitting the control signal and the second filtered signal to an external computing entity.

* * * * *

UNITED STATES PATENT AND TRADEMARK OFFICE
CERTIFICATE OF CORRECTION

PATENT NO. : 10,785,059 B2
APPLICATION NO. : 16/372201
DATED : September 29, 2020
INVENTOR(S) : Brian D. Hart et al.

It is certified that error appears in the above-identified patent and that said Letters Patent is hereby corrected as shown below:

On the Title Page

Item [56], Line 2, delete "Werrestrial" and insert -- Terrestrial --.

In the Specification

Column 8, Line 10, after "bandwidth" insert -- . --.

Column 12, Line 10, delete "that that" and insert -- that --.

In the Claims

Column 16, Lines 36-37, in Claim 7, delete "a a" and insert -- a --.

Signed and Sealed this
Twenty-fourth Day of January, 2023

Katherine Kelly Vidal
*Director of the United States Patent and Trademark Office*